W. HAMILTON.
TIRE.
APPLICATION FILED AUG. 3, 1920.
1,361,721.
Patented Dec. 7, 1920.
2 SHEETS—SHEET 1.
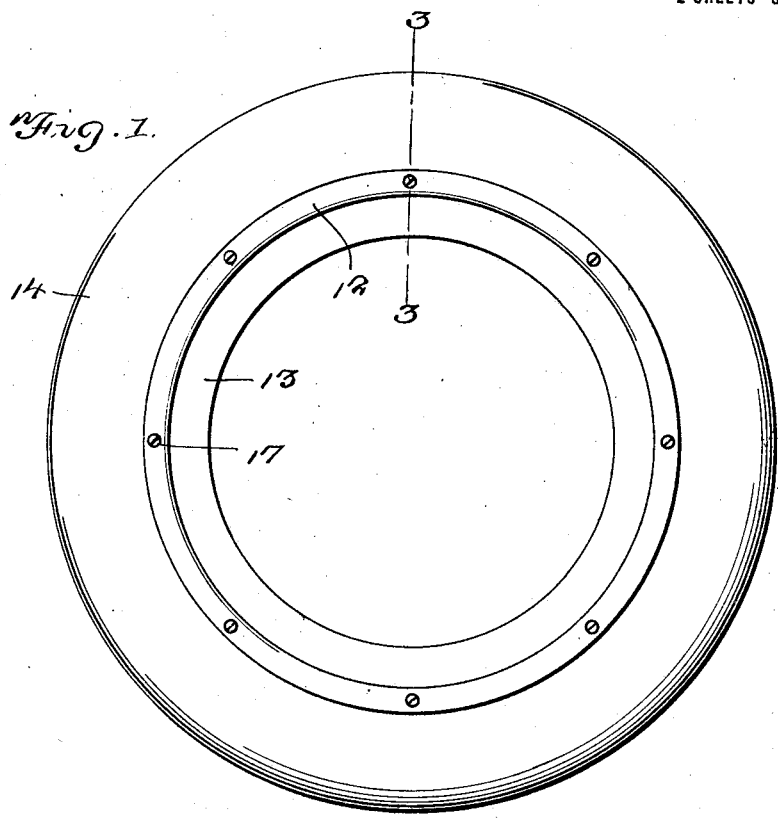
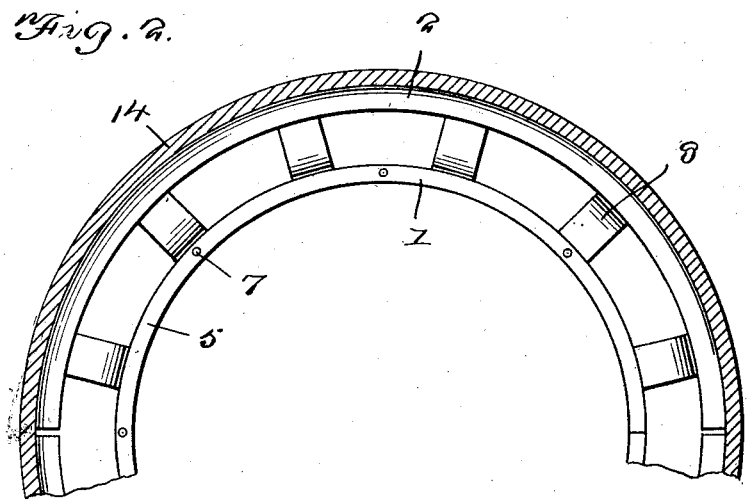
William Hamilton
INVENTOR W. HAMILTON.
TIRE.
APPLICATION FILED AUG. 3, 1920.
1,361,721.
Patented Dec. 7, 1920.
2 SHEETS—SHEET 2.
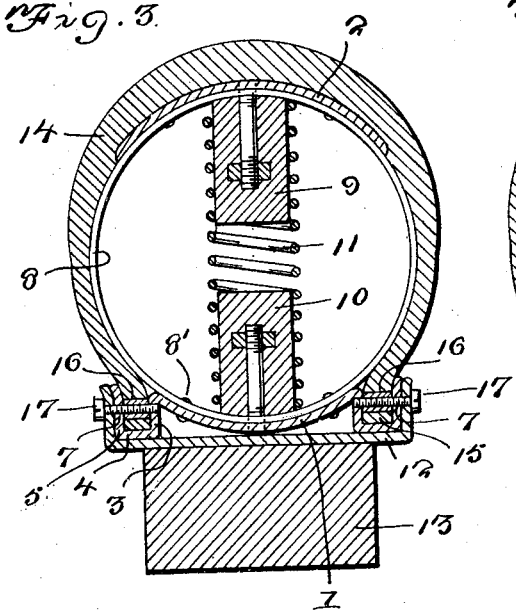
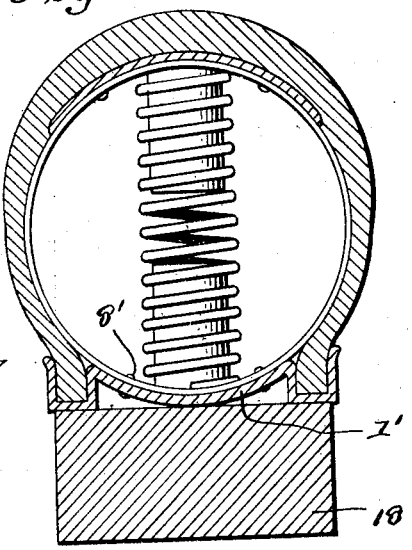
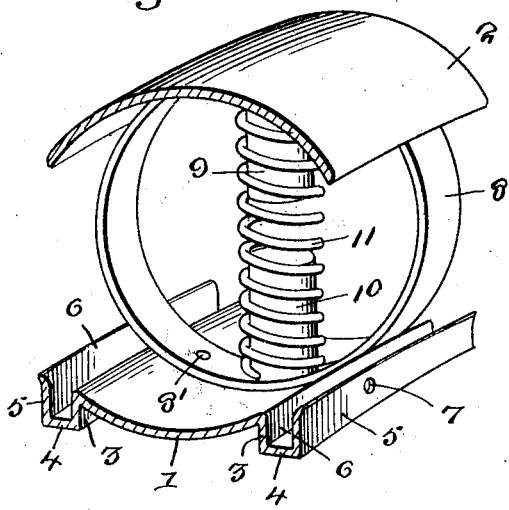
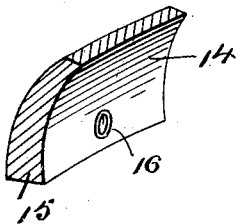
WITNESS:
E. R. Ruppert.
William Hamilton
INVENTOR
BY Victor J. Evans
ATTORNEY

UNITED STATES PATENT OFFICE.

WILLIAM HAMILTON, OF ST. JOHN, NEW BRUNSWICK, CANADA.

TIRE.

1,361,721.  Specification of Letters Patent.  Patented Dec. 7, 1920.

Application filed August 3, 1920. Serial No. 400,949.

*To all whom it may concern:*

Be it known that I, WILLIAM HAMILTON, a citizen of Dominion of Canada, residing at St. John, in the Province of New Brunswick and Dominion of Canada, have invented new and useful Improvements in Tires, of which the following is a specification.

Primarily this invention has reference to a resilient filler member for tires, but it also contemplates novel means whereby the casing or shoe of the tire may be secured to the filler member.

The principal object is the provision of spring influenced means whereby the casing or shoe of an ordinary tire will be afforded all of the desired qualities of a pneumatic tire without the disadvantages thereof, such for instance as the liability to puncture, the requirement of inflation, etc.

It is a further object to produce a filler member for the rubber casing of a tire comprising inner and outer annular members which may be split if desired, and which are connected to each other by resilient ring shaped bands, between the said bands being compressible elements which also form seats for helical springs that retain the bands in their normal expanded position and the inner and outer members of the tire properly related.

The foregoing, and other objects which will appear as the nature of the invention is better understood, may be accomplished by a construction, combination and operative arrangement of parts such as is disclosed by the drawings.

In the drawings:—

Figure 1 is a side elevation of the tire arranged around the felly of a wheel, and engaged by the rim thereof.

Fig. 2 is a partial side elevation of the improvement, the tire casing being in section.

Fig. 3 is a sectional view approximately on the line 3—3 of Fig. 1, on an enlarged scale.

Fig. 4 is a fragmentary perspective view of the filler member.

Fig. 5 is a sectional view illustrating a modification wherein the filler member may be directly secured to the felly of the wheel.

Fig. 6 is a fragmentary perspective view of the rim or edge portion of the shoe or casing.

As disclosed by the drawings, the improved metallic filler member comprises an inner annular member 1 and an outer annular member 2. The member 2 is of a concavo-convex cross sectional formation, the concaved face being disposed adjacent to the outer face of the section 1. The sections 1 and 2 may be of any desired width to properly receive the rubber shoe or casing of the ordinary tire thereon, as will presently be understood. The inner member 1, in the preferred embodiment of the improvement has its edges formed with depending continuous flanges 3 which have their edges bent outwardly, as at 4, and from thence upwardly, as at 5 providing a continuous groove or pocket 6 between the flanges 3 and 5. The outer flange of each of the pockets 6, at determined intervals has threaded openings 7 therethrough. The sections 1 and 2 are held in spaced relation to each other by equi-distantly spaced ring members 8. The rings are constructed from flat bands of spring material, and are comparatively large, and are connected to the sections 1 and 2 preferably by rivets 8'. In the center of each of the rings, at the portions thereof secured to the sections 1 and 2 there are confronting buffer members 9 and 10 respectively. The buffer members are preferably constructed of solid rubber blocks which are round in cross section, and are retained a distance away from each other, but are brought into contacting engagement when the wheel is subjected to an abnormal strain or load. To assist in maintaining the rings 8 in their normal annular form and the sections 1 and 2 properly spaced, the confronting buffer members 9 and 10, in each of the rings 8 is surrounded by a helical spring 11.

The buffer members are preferably held on the rings by screw members which are embedded therein and which enter threaded openings in the said rings, and if desired in the sections 1 and 2.

The outer casing 14 is substantially similar to that of the ordinary construction, but is of a size to snugly surround the filler member and to have its edges received in the pockets 6. Therefore I enlarge the edges of the shoe 14, on the outer face thereof, as indicated by the numeral 15, and at certain intervals pass through the said enlargements metallic interiorly threaded sleeves 16. The sleeves 16 are designed to register with the openings 7 in the outer wall 5 of the pockets 6, and passing through these openings are screws 17 that engage with the threads of the sleeves 16.

The inner member 1 may have its flanges 5 engaged by the tire carrying rim 12 on the felly of the wheel, while in the modified form of the improvement the construction is similar to that previously described, with the exception that the inner section 1' rests directly on the felly 18 of the wheel.

Having thus described the invention, what I claim is:—

1. A spring filler member for pneumatic tire casings comprising an inner annular and an outer annular member, the first mentioned member having pockets on the edges thereof, spring rings secured to and spacing the members, confronting buffers in the rings, and a tire casing designed to have its edges received in the pockets of the inner member and secured thereto.

2. A resilient filler member for pneumatic tire casings, comprising an inner annular member designed to rest on the rim of a wheel and an outer annular member which is of a concavo-convex cross sectional formation, spring rings between the members secured thereto and spacing the same, buffers having confronting ends in each of the rings, springs surrounding the confronting buffers, the inner member of the filler member having its edges provided with continuous pockets, and a tire casing designed to have its edges received in the pockets and secured to the filler member.

3. A filler member for pneumatic tire casings constructed of spring metal and comprising an inner annular member, an outer annular member surrounding the inner member but spaced therefrom, said inner member having its edges flanged to provide pockets, flat rings between the members and secured thereto, confronting buffers in each of the rings, springs surrounding the buffers, and exerting a tension against the respective rings, a tire casing having its edges enlarged and received in the pockets, securing means therefor, and the inner and outer sections of the filler member comprising split members.

In testimony whereof I affix my signature.

WILLIAM HAMILTON.